(12) United States Patent
Aravamudan et al.

(10) Patent No.: US 6,584,076 B1
(45) Date of Patent: Jun. 24, 2003

(54) TELECOMMUNICATIONS CONFERENCING METHOD AND APPARATUS

(75) Inventors: Murali Aravamudan, Freehold, NJ (US); Prakash Iyer, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/183,994

(22) Filed: Nov. 2, 1998

(51) Int. Cl.⁷ .............................................. H04L 12/16
(52) U.S. Cl. ...................................... 370/260; 270/238
(58) Field of Search .................. 370/259, 260, 370/261, 262, 401, 238, 238.1; 379/201.01, 202.01, 203.01; 455/414, 416; 709/241, 204, 205

(56) References Cited

U.S. PATENT DOCUMENTS

| | | | | |
|---|---|---|---|---|
| 4,796,293 A | | 1/1989 | Blinken et al. ............. | 379/202 |
| 5,828,743 A | | 10/1998 | Pinnell et al. .............. | 379/204 |
| 5,991,276 A | * | 11/1999 | Yamamoto .................. | 370/260 |
| 5,995,608 A | | 11/1999 | Detampel, Jr. et al. ...... | 379/205 |
| 6,035,026 A | * | 3/2000 | Kim .......................... | 379/202 |
| 6,088,361 A | * | 7/2000 | Hughes et al. .............. | 370/439 |
| 6,163,544 A | * | 12/2000 | Andersson et al. .......... | 370/422 |
| 6,337,864 B1 | * | 1/2002 | Nitta et al. .................. | 370/428 |

FOREIGN PATENT DOCUMENTS

EP 99308424.3-2209 8/2000

* cited by examiner

*Primary Examiner*—Ajit Patel
(74) *Attorney, Agent, or Firm*—Eugene J. Rosenthal (57) ABSTRACT

A conference bridge is selected for a conference call so as to reduce the overall cost of the conference call, and the conference bride selected may be changed dynamically, e.g., as parties are added or dropped from the conference call, so as to continuously maintain the low cost of the conference call. User telephones are connected via device servers, which may include a packet circuit gateway (PCG), to a packet network which provides both transport and service. Accordingly, in response to a request for a conference call, the packet network determines the parties to be on the conference call and selects a conference bridge that results in the lowest cost for the conference call, e.g., a bridge located more closely to two of the parties on the conference call. In the event the parties on the conference call change, e.g., by adding an additional party and possibly also by dropping a party already on the call, a new conference bridge is selected for the call that would keep the cost low for the call as configured with the revised parties and the information streams from all of the parties that remain on the call are directed the new conference bridge. Once the transition to the new conference bridge is completed, the old conference bridge is released for use by another conference.

20 Claims, 4 Drawing Sheets

TELECOMMUNICATIONS CONFERENCING METHOD AND APPARATUS

TECHNICAL FIELD

This invention relates to the art of telecommunications conferencing, such as audio and video conferencing.

BACKGROUND OF THE INVENTION

Prior art audio conferencing requires a conference bridge. This bridge is located at a location which is fixed for each conference call. Thus, for so-called three-way calling, which is a form of conference calling which is originated by a single caller who calls two different people, the conference bridge is located in the local exchange carrier (LEC), e.g., in a switch or adjunct thereof, serving the originating caller. From the bridge a trunk is required to connect to each of the conferenced in parties if they are served by a different LEC, necessitating the use of two trunks. Thus, the cost of such a call is at least the cost of the local line from the caller to the LEC the cost of the two trunks.

SUMMARY OF THE INVENTION

I have recognized that when the called parties to be conferenced in are within close proximity to each other from a telecommunications point of view, e.g., they are served by the same LEC, that it would be cheaper to have the conferencing bridge located closer to the called parties, e.g., with the LEC serving them. This would reduce to the cost of the conference call to the cost of two local connections and the cost of one trunk.

Therefore, in accordance with the principles of the invention, a conference bridge is selected for a conference call so as to reduce the overall cost of the conference call, and the conference bride selected may be changed dynamically, e.g., as parties are added or dropped from the conference call, so as to continuously maintain the low cost of the conference call.

In an exemplary embodiment of the invention, the local telephone switches which interface with user telephones are connected to device servers which each includes a packet circuit gateway (PCG) for coupling user information, including voice, data, signaling, and the like, onto a packet network which provides both transport and service. Accordingly, in response to a request for a conference call, the packet network determines the parties to be on the conference call and selects a conference bridge that results in the lowest cost for the conference call, e.g., a bridge located more closely to two of the parties on the conference call. In the event the parties on the conference call change, e.g., by adding an additional party and possibly also by dropping a party already on the call, a new conference bridge is selected for the call that would keep the cost low for the call as configured with the revised parties and the information streams from all of the parties that remain on the call are directed the new conference bridge. Once the transition to the new conference bridge is completed, the old conference bridge is released for use by another conference.

Other telephones which employ a device server and can connect directly to a data network without being connected behind conventional circuit switching switches or requiring a packet circuit gateway, such as Internet Protocol (IP) telephones, may also be part of conference calls served by a conference bridge and their location may be taken into account when selecting a conference bridge.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that the various flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

In accordance with the principles of the invention, a conference bridge is selected for a conference call so as to reduce the overall cost of the conference call, and the conference bride selected may be changed dynamically, e.g., as parties are added or dropped from the conference call, so as to continuously maintain the low cost of the conference call.

Figure 1:
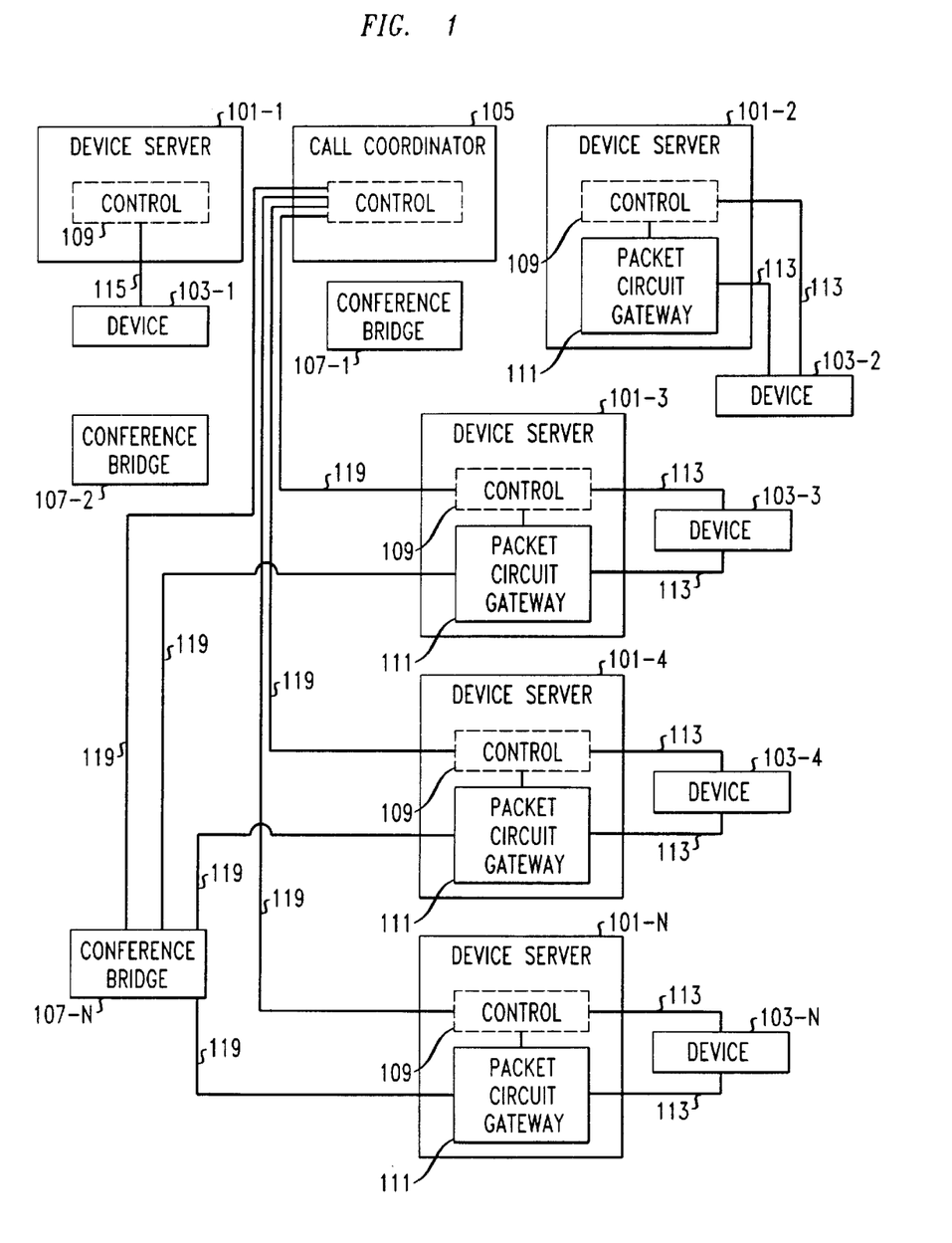
FIG. 1 shows a logical representation of an exemplary embodiment of the invention in which communication is achieved digitally and the particular conference bridge employed at any particular time during a call is selected so as to minimize the overall cost of a call based on prescribed call cost criteria.

FIG. 1 shows a logical representation of an exemplary embodiment of the invention in which communication is achieved digitally and the particular conference bridge employed at any particular time during a call is selected so as to minimize the overall cost of a call based on prescribed call cost criteria. FIG. 1 shows a) device servers 101, including device servers 101-1 through 101-N; b) devices 103, including devices 103-1 through 103-N; c) call coordinator 105; conference bridges 107, including conference bridges 107-1 through 107-N; d) links 113 and 115; and e) data network links 119 which together form a data network.

Device servers 101 are protocol translators which translate the protocol of a device being served by the device server to a common call control protocol. Each of device servers 101 include at least a control unit 109 and they each may also include a packet circuit gateway 111 to handle the media portion, e.g., voice and/or video, of the call. Control unit 109 is typically implemented by a processor running software, the processor including, or being coupled to, a packet communication interface. Each packet circuit gateway 111 may include a processor, which may be shared with control unit 109, and may also include media processing capabilities, such as digital to analog and analog to digital converters for media and capabilities to packetize media or reconstruct media from packetized format.

More specifically, in the term "device server", "server" is used in the conventional manner of the "client-server" architecture, where the server serves request from the clients and does not take action unless it is in response to a client request. Each device server 101 maintains protocol state information for the protocol that it uses to communicate with call coordinator 105. Each device server 101 exposes itself as a hierarchical namespace so that any client that wants to make use services provided by any particular one of device servers 101 accesses that particular one of device servers 101 as if it is accessing a distributed file system. Typical device servers represent physical/logical telephone devices, which include a) end-point device servers and b) gateway device servers.

A primary function of device servers 101 is to act as an interface between the data network made up of links 119 that connects device servers 101 and call coordinator 105 and some other external network or device, e.g., a legacy network or a legacy piece of equipment. To this end, each device server 101 may be a valid entity in a legacy network that can employ the appropriate protocol of that legacy network. By exposing a namespace to its clients, namely, call coordinator 105, device servers 101 shield call coordinator 105 from specific signaling protocols of the legacy network or legacy equipment to which they respectively connect. This is achieved by maintaining protocol specific state in device servers 101.

Devices 103 are any communication tool, such as a conventional plain old telephone service (POTS) telephone, an Internet protocol (IP) telephone, or telecommunications switches. The individual ones of devices 103, e.g., device 103-1 and device 103-N, need not be the same. Thus, devices 103 are, collectively, all the devices connected to the communications system of FIG. 1.

Each particular one of devices 103 is interfaced to one of device servers 101. Such a connection is necessary for control purposes, as each device server 101 includes one of control units 109. However, each device 103 need not be interfaced to a one of device servers 101 that has a packet circuit gateway for media purposes, such as if the device being interfaced already is compatible with the protocol employed by the data network made up of data network links 119. One such device is device 103-1, which can transmit directly over the network, such as an IP telephone, and so it is coupled to device server 101-1, which does not include a packet circuit gateway.

A call coordinator, such as call coordinator 105, accomplishes communications among various device servers. Call coordinator may be implemented as a software module that is executed by a computer connected to the network to which the device servers are attached. The computer executing call coordinator 105 may be separate from the computer, or computers, of device servers 101, or it may share processing power with one or more of the computers of device servers 101, or other computers attached to the network. Alternatively, the functionality of call coordinator 105 may be distributed over several computers, which may be separate from, or shared with, the computers of device servers 101, in any combination. Although not shown in FIG. 1, a single network may have more than one call coordinator attached to it, with each call coordinator handling zero, one, or more calls.

The notion of call/communication, and any associated management tasks, is entirely handled by call coordinator 105. Call coordinator 105 functions in the role of the "client" of the conventional "client-server" architecture, e.g., it initiates requests for services to the various ones of device servers 101. Typically, such requests are in response to a so-called "event" that is detected by call coordinator 105. Since the call coordinator is the client, it is able to request service from various ones of device servers 101 as is appropriate for the service being provided on a particular call and consistent with stored rules or registrations.

Each of device servers 101 are unaware of communication state, which is the interaction among multiple device servers. Instead, communication state is maintained by call coordinator 105, which exposes the communication state as a hierarchical namespace. As a client of device servers 101, call coordinator 105 manipulates device servers 101 to accomplish communications. Call coordinator 105 furthermore captures and exports such an interaction, known as a "call session", as a hierarchical namespace.

Call coordinator 105 treats the processing of a call as a sequence of steps each of which can be implemented by a small piece of computer executable code called a "feature applet". Feature applets perform a specific step in call processing and as part of the step it typically manipulates the call tree of the namespace exposed by call coordinator 105. That is, apart from loading the feature applets, call coordinator 105 and the feature applets communicate entirely through a call tree. Feature applets can be dynamically loaded and executed by call coordinator 105. The feature applet code can be located somewhere else in the network and can be loaded on the fly from the network, or the feature applet itself can even be executed somewhere else in the network. Since the session state is manipulated using the call tree which is exposed by the call coordinator as a hierarchical namespace, the location where the feature applet executes, as part of processing the current call/session is irrelevant.

Call coordinator 105 supports an explicit user model. That is, users of the system are authenticated by the call coordinator and are bound to specific devices. Users of the system may also dictate what feature applets are run by call coordinator 105 while processing a call on their behalf. To accomplish this, feature applets may be logically grouped for every user of the system. Advantageously, call coordinator 105 provides a facility for incrementally evolving the system for each user.

A call consists of one or more users with each user controlling one or more device servers 101. Call coordinator 105 controls the adding and dropping of users as well as actual ones of device serves 101 to the conference, in addition to specifying which of conference bridges 107 should be used for any particular time for any call. Furthermore, call coordinator 105 may arrange for direct connection between ones of device servers 101 when there are only two device servers on a call rather than using one of conference bridges 107. Furthermore, call coordinator 105 may specify that more than one conference bridge 107 is to be employed, the conference bridges being linked, if doing so results in an overall lower cost. Such a situation may result, for example, if groups of devices 101 on a single call are clustered geographically, e.g., three in the United States and four in Europe.

For more information on device servers, call coordinators, and overall operation of a communications network such as shown in FIG. 1, the reader is directed to U.S. patent application, Ser. No. 09/09,249, which is incorporated by reference as if set forth herein in its entirety.

Conference bridges 107 perform conferencing functions, including media mixing. They may also perform media functionalities such as mute, hold, add sound effects at the behest of call coordinator 105. Conference bridges may also include, or make use of, transcoding capabilities, i.e., the ability to transform one media format to another. For example, a conference bridge may transform media between Lucent SX7300P coder format and G711 standard media format. Furthermore, some conference bridges may be capable of handling data of different types and formats, e.g., voice and video or voice in various formats such as G711 mu-law at 64 Kbps and G.729 encoded voice at 6 Kpbs, while some conference bridges can handle data of only a single type or a single format.

Data network links 119 form a data network, for example, an Internet-like network or a so-called intranet. Depending on the nature of device 111, link 121 may be a data network link similar to data network links 119 or it may proprietary type of link unique to the use of device 111. Data network links 119 may be links such as logical links, e.g., where real time protocol/universal datagram protocol (RTP/UDP) is used, or virtual circuit links, e.g., where asynchronous transfer mode (ATM) is employed.

Links 113 are logical links which represent the transmission of control and media separately. This separation is purely for pedagogical purposes. In practice, both control and media may be sent over the same link and handled appropriately by devices 103 and their respective associated one of device servers 101.

A conference call is defined as any call on which there are three or more device servers 101. The conference call may start out known to be a conference call or it may start out as requiring less than three device servers 101 and at least one of device server 101 is added later. When call coordinator 105 determines that a call requires a conference bridge, e.g., the call involves more than two of device servers 101, it arranges for one of conference bridges 107 to be used by the call. In accordance with the principles of the invention, call coordinator 105 selects the particular one of conference bridges 107 to be employed as a function of a specified criteria. The criteria may include cost and/or capabilities to achieve the desired conference call. In one embodiment of the invention, cost is determined by the location of the media sources for the ones of device servers 101 that are participating in the conference call, and selects one of conference bridges 107 which would minimize the cost.

Once call coordinator 105 selects a particular one of conference bridges 107 for the call, it identifies the selected one of conference bridges 107 to each of device servers 101 on the call, e.g., by specifying the Internet protocol (IP) address and port. Call coordinator 105 also identifies each of the ones of device servers 101 to the selected one of conference bridges 107. The media part of each of the ones of device servers 101 that are on the conference call then begins transmitting media in the form of packets, e.g., RTP/UDP packets, to the selected one of conference bridges 107. Each of device servers 101 that are on the call and do not include a packet circuit gateway for providing media, such as device server 101-1, instructs its associated one of devices 103 to provide the media directly.

FIG. 1 shows a conference call between three devices, devices 103-3, 103-4, and 103-N. These devices are located in a geographic area that, from the point of view of the data network made up of data links 119. Although device servers 101-3, 101-4, and 101-N are shown separately in FIG. 1, because FIG. 1 is a logical representation, device servers 101-3, 101-4, and 101-N may actually be implemented by a single device server, e.g., if devices 103-3, 103-4, and 103-N were all connected to the same local exchange telephone switch, such as Number 5 Electronic Switching System (5ESS) available from Lucent Technologies. Because of the proximity of device servers 101-3, 101-4, and 101-N to each other and to conference bridge 107-N, conference bridge 107-N is selected as the conference bridge for the conference call by call coordinator 105.

In the event that another device server is added to the conference, e.g., at the request of one of the users, call coordinator 105 evaluates the conference call as it will be with the additional conferee and selects a conference bridge for the call. In accordance with one embodiment of the invention this conference bridge may be selected from one of the currently available conference bridges or the conference bridge that is currently being used by the conference to which the conferee is being added. In accordance with another embodiment of the invention the conference bridge may be selected from all the conference bridges and, if necessary, a conference call which may already be using the selected bridge can itself be reassigned to another conference bridge selected for it. This would typically only be done provided that the final configuration of both conference calls results in the lowest overall cost to the entire system.

Once the new conference bridge is selected the call coordinator instruct each existing device server to start using the newly selected conference bridge, provided that it is different from the conference bridge already being used by the conference call. This may be achieved by identifying the new conference bridge to each device server on the call, e.g., by specifying the Internet protocol (IP) address and port. The call coordinator also identifies each of the device servers to the newly selected conference bridge. The media part of the device server then begins transmitting media in the form of packets, e.g., RTP/UDP packets, to the newly selected conference bridge. If the device server does not include packet circuit gateway for providing media, the device server instructs the device being served by the device server to provide the media directly to the newly selected conference bridge.

Figure 2:
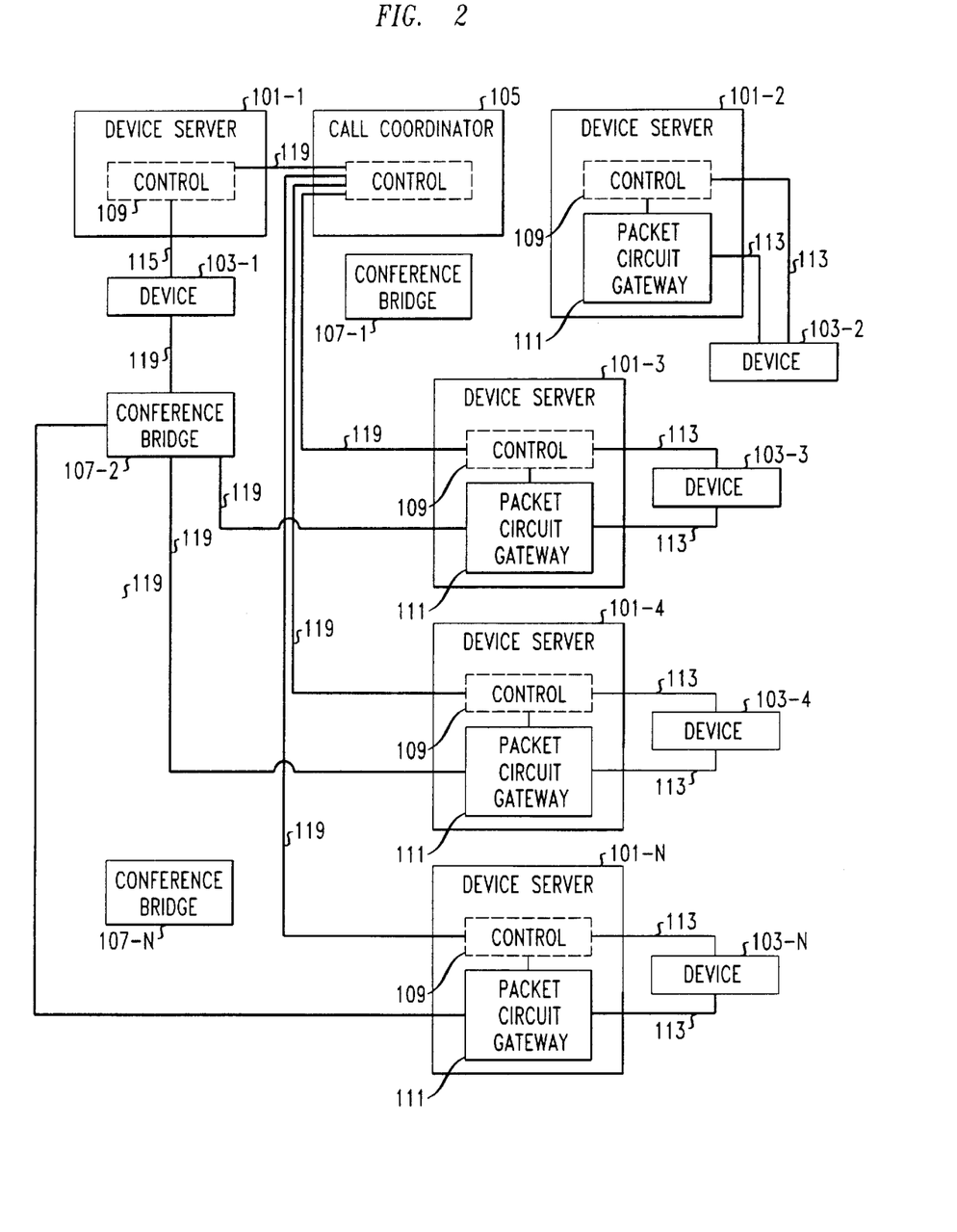
FIG. 2 shows the addition of a device server to the conference call shown in FIG. 1.

FIG. 2 shows the addition of device server 101-1 to the conference call shown in FIG. 1. The addition of device server 101-1 adds to the conference call devices 103-1. The location used to determine which of conference bridges 107 to use is based on the source of the media in packet form that can go over links 119. Because device 103-1 directly provides media that can go over links 119, the location of device 103-1 is used. In the example of FIGS. 1 and 2 device 103-1 is located somewhat remotely from device servers 101-3, 101-4, and 101-N. Therefore, call coordinator 105, when adding device 103 determines that the best conference bridge to server the conference call with device 103-1 added on is conference bride 107-2.

Once call coordinator 105 has selected conference bridge 107-2, it identifies conference bridge 107-2 to device servers 101-3, 101-4, and 101-N, as well as device 103-1. Device servers 101-3, 101-4, and 101-N, as well as device 103-1 are also identified to conference bridge 107-2. Thereafter, device servers 101-3, 101-4, and 101-N as well as device 103-1 transmit media to conference bridge 107-2, and receive media therefrom.

In the event that another device server is dropped from the conference, e.g., at the request of one of the users, the call coordinator evaluates the conference call as it will be with the one less conferee and selects a conference bridge for the call. In accordance with one embodiment of the invention this conference bridge may be selected from one of the currently available conference bridge or the bridge that is currently being used by the conference to which the conferee is being added. In accordance with another embodiment of the invention the conference bridge may be selected from all the conference bridges and, if necessary, a conference call which may already be using the selected bridge can itself be reassigned to another conference bridge selected for it. This would typically only be done provided that the final configuration of both conference calls results in the lowest overall cost to the entire system.

Once the new conference bridge is selected the call coordinator instruct each existing device server to start using the newly selected conference bridge, provided that it is different from the conference bridge already being used by the conference call. This may be achieved by identifying the new conference bridge to each device server on the call, e.g., by specifying the Internet protocol (IP) address and port. The call coordinator also identifies each of the device servers to the newly selected conference bridge. The media part of the device server then begins transmitting media in the form of packets, e.g., RTP/UDP packets, to the newly selected conference bridge. If the device server does not include packet circuit gateway for providing media, the device server instructs the device being served by the device server to provide the media directly to the newly selected conference bridge.

The foregoing may be performed only in the event that there yet remains at least three device servers on the call. However, in the event that there yet remains on the call only two device servers, call coordinator may decide to dispense with the use of a conference bridge and to instead instruct the remaining device servers to communicate media directly with each other, e.g., by providing to each the IP and port of the other.

Figure 3:
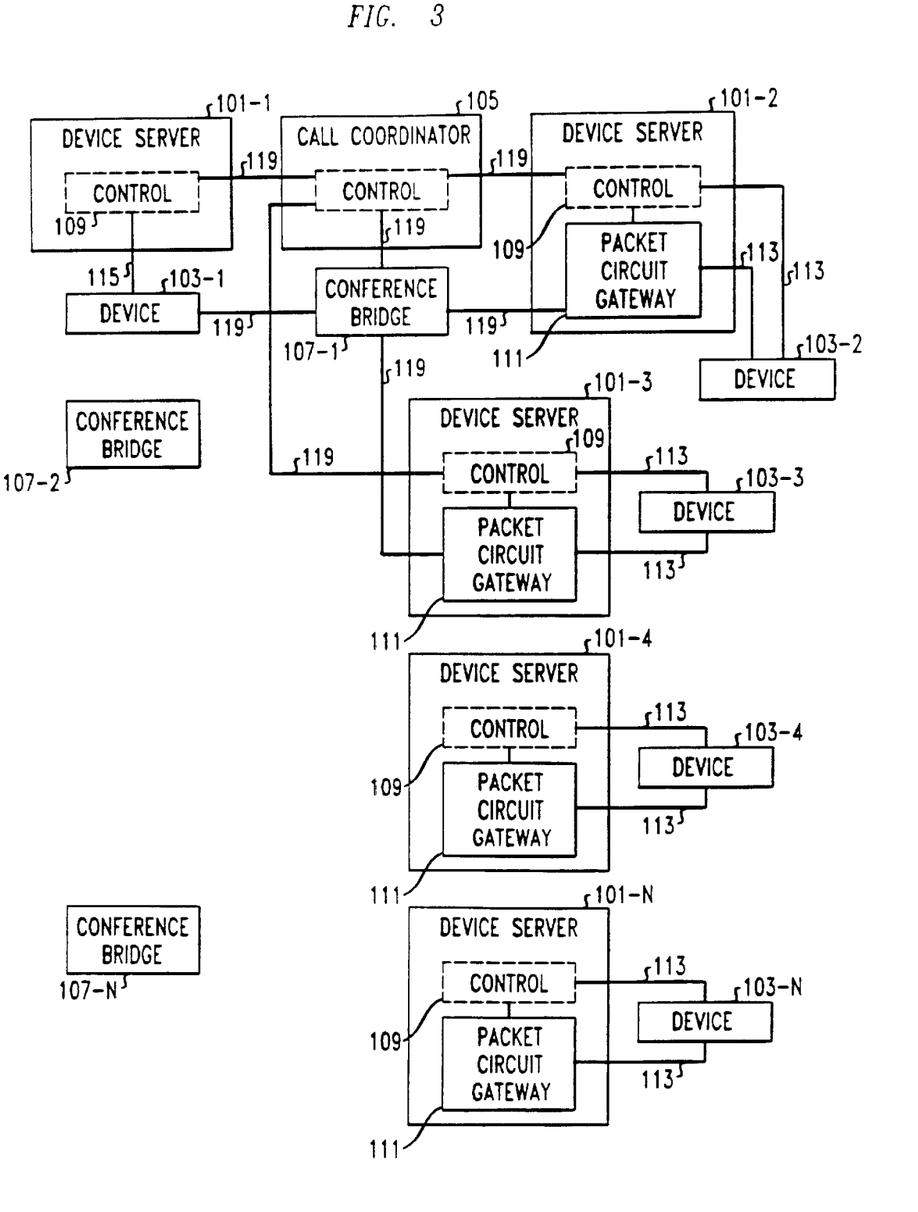
FIG. 3 shows how the conference call shown in FIG. 2 is changed after two device servers are dropped from the conference call and a device server is added to the conference call.

FIG. 3 shows how the conference call shown in FIG. 2 is changed after device servers 101-4 and 101-N are dropped from the conference call and device server 101-2 is added. The dropping of device servers 101-4 and 101-N result in the dropping from the conference call of devices 103-4 and 103-N. The addition of device server 101-2 adds to the conference call devices 103-2. Thus, the resulting conference includes device servers 101-1, 101-2, and 101-3. Because of the proximity of device servers 101-2, and 101-3 and device 103-1 to each other and to conference bridge 107-1, conference bridge 107-1 is selected as the conference bridge for the conference call by call coordinator 105.

Once call coordinator 105 has selected conference bridge 107-1, it identifies conference bridge 107-1 to device servers 101-2 and 101-3, as well as device 103-1. Device servers 101-2 and 101-3, as well as device 103-1 are also identified to conference bridge 107-1. Thereafter, device servers 101-2 and 101-3, as well as device 103-1 transmit media to conference bridge 107-1, and receive media therefrom. Also, at some point during the process, e.g., prior to selecting conference bridge 107-1 or prior to changing where the media is sent, call coordinator 105 drops device servers 101-4 and 101-N from the call, and instructs them to no longer send media to conference bridge 107-2

Figure 4:
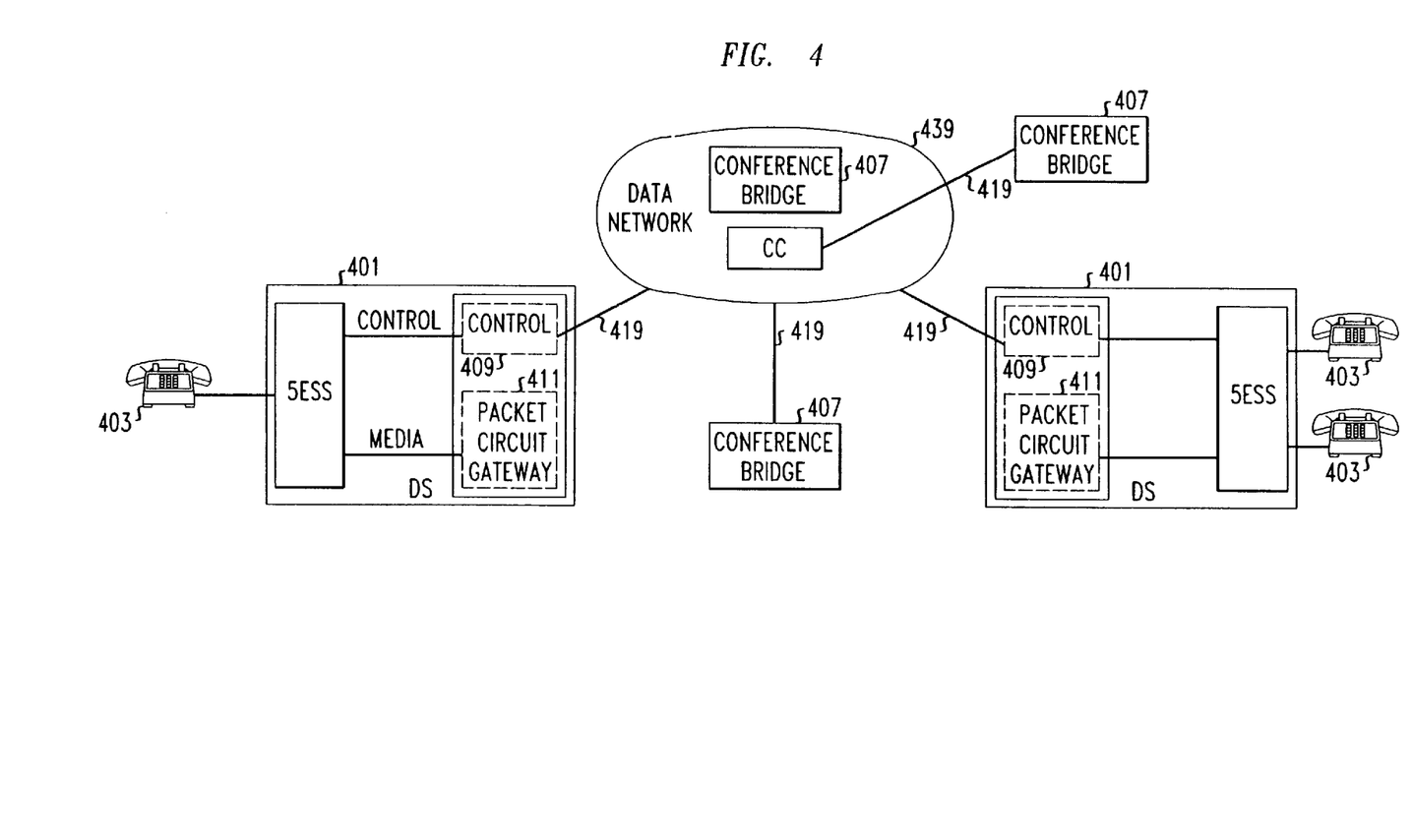
FIG. 4 shows a more traditional view of a network in accordance with principles of the invention.

FIG. 4 shows a more traditional view of a network in accordance with principles of the invention. Shown in FIG. 4 are device servers 401, devices 403, data network 439, and conference bridges 407. Device servers 401 correspond to device servers 101 of FIG. 1. However, in FIG. 4, some more explicit implementation details of a particular embodiment of device servers 401 are shown. Specifically, device servers 401 are shown to include control device server 409, control unit 409 and they each may also include a packet circuit gateway 411 to handle the media portion, each being coupled to a No. 5ESS. Devices 403 are units such as telephones. Data network 439 is made up of data links 419 which correspond to data links 119 of FIG. 1. Lastly, conference bridges 407 corresponds to conference bridges 107 of FIG. 1.

Note that when the conference bridge for a call is changed any portion of the call that may be carried over circuit switched facilities remains completely unchanged. Additionally, the change of conference bridge is substantially transparent to the users. Typically, at most, the users will hear a small amount of noise during the changing of the conference bridge.

Those of ordinary skill in the art will recognize that the foregoing principles may be applied directly in the circuit switched network area provided that the necessary extensions for the signaling protocol are developed and deployed. Such extensions may be developed by those of ordinary skill in the art.

What is claimed is:

1. Apparatus for establishing a conference call between at least three device servers, comprising:

three or more device servers, which are protocol translators that translate the protocol of a device being served by the device server to a common call control protocol, each of said devices being coupled to a respective one of said device servers;

a plurality of conference bridges, use of each of said conference bridges to establish said conference call results in an associated cost for said call; and the apparatus being CHARACTERIZED in that the one of said bridges which serves said conference call at any time is changeable over the duration of said conference call the apparatus being CHARACTERIZED BY a call coordinator which accomplishes communications among said device servers and selects a one of said conference bridges to currently serve said conference call so as to yield a minimum cost for said conference call.

2. The invention as defined in claim 1 wherein said conference call is reconstituted by adding or dropping at least one device and wherein said call coordinator is adapted to (i) select a different one of said conference bridges as a function of a location of each device designated to be served on said reconstituted conference call by said selected conference bridge and (ii) redirect traffic for said devices on said reconstituted conference call to said different one of said conference bridges.

3. The invention as defined in claim 2 wherein said conference call is reconstituted by adding a device whose information is qualitatively different from said other devices on said conference call prior to its being reconstituted, and wherein said call coordinator is adapted to select a different one of said conference bridges from a subset of said plurality of conference bridges that can process said information from said added device whose information is qualitatively different.

4. The invention as defined in claim 2 wherein said conference call is reconstituted by dropping a device whose information is qualitatively different from said devices remaining on said conference call after to its being reconstituted, and wherein said call coordinator is adapted to select said different one of said conference bridges from a subset of said plurality of conference bridges that can process said information from said dropped device whose information is qualitatively different and those conference bridges that can process information only from those devices remaining on said reconstituted conference.

5. The invention as defined in claim 2 wherein said conference call is reconstituted by dropping a device whose information is qualitatively different from said devices remaining on said conference call after to its being reconstituted, and wherein said call coordinator is adapted to select said different one of said conference bridges from a subset of said plurality of conference bridges that can process said information only from those conferees remaining on said reconstituted conference.

6. The invention as defined in claim 1 wherein said call coordinator, said device servers, and said conference bridges are coupled by a data network.

7. The invention as defined in claim 1 wherein ones of said at least three device servers on said call are changed, and wherein said call coordinator selects a one of said conference bridges that yields a minimum cost for said conference call with said changed device servers.

8. The invention as defined in claim 1 wherein said call coordinator is adapted to identify said selected conference bridge to said device servers on said conference call.

9. The invention as defined in claim 1 wherein said call coordinator is adapted to identify said device servers on said conference call to said selected conference bridge.

10. The invention as defined in claim 1 wherein said call coordinator is adapted to direct device servers on said conference call to communicate media to said selected conference bridge.

11. The invention as defined in claim 10 wherein said media is transmitted by at least one of said device servers from a packet circuit gateway.

12. The invention as defined in claim 10 wherein at least one of said device servers is adapted to direct a device it serves to direct said device's media directly to said device server.

13. A method for use in establishing a conference call between at least three device servers which are protocol translators that translate the protocol of a device coupled to and being served by the device server to a common call control protocol, said method being performed by a call coordinator which accomplishes communications among said device servers, said method comprising the steps of:

determining a cost for each of a plurality of configurations for said conference call given each device server to be on said call at any particular time, each of said configurations using one or more of each available one of a plurality of conference bridges known to said call coordinator, the use of said conference bridges to establish said conference call resulting in an associated cost for said call, the one or more of said bridges which serves said conference call at any time being changeable over the duration of said conference call; and selecting initially and on an ongoing basis, by said call coordinator, a one of said configurations that has a lowest cost.

14. The invention as defined in claim 13 wherein said configuration having a lowest cost employs only a single one of said conference bridges.

15. The invention as defined in claim 13 wherein said configuration having a lowest cost employs at least two of said conference bridges.

16. The invention as defined in claim 13 wherein said available conference bridges are not in use when said call coordinator is performing said determining step.

17. The invention as defined in claim 13 wherein said available conference bridges include at least one conference bridge that is in use when said call coordinator is performing said determining step.

18. The invention as defined in claim 17 wherein said call coordinator repeats said determining step for at least one conference bridge that is in use when said call coordinator is performing said determining step.

19. The invention as defined in claim 17 wherein said call coordinator repeats said determining step for at least one conference bridge that is in use when said call coordinator is performing said determining step and selects said for at least one conference bridge that is in use when said call coordinator is performing said determining step only when said cost of said determining step and said repeated determining step combined are a lowest overall cost.

20. The invention as defined in claim 17 further including the step of relocating a conference using said conference bridge that is in use when said call coordinator is performing said determining step when said call coordinator selects said conference bridge that is in use when said call coordinator is performing said determining step.

\* \* \* \* \*